United States Patent Office 3,449,282
Patented June 10, 1969

3,449,282
METHOD OF PREPARING POLYMER EMULSION USING NONIONIC PHOSPHATE TRIESTER SURFACTANT
Nathan Lasher and Richard W. Lasher, Los Angeles, Calif., assignors to Jennat Corporation, Gardena, Calif., a corporation of California
No Drawing. Filed Jan. 3, 1966, Ser. No. 518,034
Int. Cl. C08f 1/13; C09d 5/02, 3/74
U.S. Cl. 260—29.6                                           10 Claims

ABSTRACT OF THE DISCLOSURE

A polymerizable composition and a method of polymerization is disclosed for the production of a pigment-binder emulsion. The composition comprises an aqueous emulsion of a vinyl monomer such as vinyl acetate and a non-ionic phosphate triester surfactant completely esterified with at least one polyethylene oxide moiety containing 2 to 100 oxide units and one or two alkyl groups containing 2 to 25 carbon atoms. Preferably, the emulsion contains the phosphate triester surfactant as at least 10% of the total surfactants present. A polymeric pigment-binder emulsion is prepared by polymerizing a vinyl monomer in an aqueous emulsion containing said phosphate triester surfactant.

BACKGROUND OF THE INVENTION

The present invention relates to polymerized and co-polymerized materials and more particularly to an emulsion polymerized material finding particular utility as a pigment binder and the method of manufacturing it.

DESCRIPTION OF THE PRIOR ART

At present, various techniques are employed to produce homopolymer and copolymer emulsions used as pigment binders. In one process, referred to as a reflux delayed addition emulsion polymerization in a batch-type process, the emulsion or binder is produced by combining selected monomers and/or comonomers with deionized water, protective colloids, surfactants and other processor-controlling materials in a series of controlled process stages. Each stage of the process is controlled to insure that all the monomers and comonomers are completely polymerized and that the particles of the emulsion do not exceed a desired size.

When developing an emulsion polymer to act as a pigment binder, it is most important that the emulsion polymer have properties compatible with the properties of the various pigments with which it is to be mixed so that it can be used satisfactorily with as large a number of pigment types as possible. Among such properties are the emulsion's property to be mixed with different pigments without coagulating, and readily accept and retain the pigment's colors. Other desirable properties include the binder's ability to withstand weathering conditions such as sun, moisture, and abrasion; as well as exhibit good non-bubbling characteristics.

OBJECTS AND SUMMARY OF THE INVENTION

It is an object of the present invention to provide a new emulsion polymer.

Another object is the provision of a new emulsion polymer with properties particularly desirable in a pigment binder.

A further object is to provide a pigment binder with a high degree of durability and resistance to weathering conditions such as ultra-violet rays, water, and frictional forces, such as scrubbing.

Still another object of the invention is to provide an emulsion polymerization pigment binder with highly satisfactory color acceptance and color retention properties.

DESCRIPTION OF THE PREFERRED EMBODIMENTS

These and other objects of the invention are achieved in a polymerized emulsion in which is included a triester phosphate as one of the surfactants used during the manufacturing process. It has been found that by using such a surfactant as one of the surfactants in the polymerization process, the final product possesses all the above-recited properties desired in a pigment binder. A completely esterified or triester nonionic phosphate surfactant of the general types,

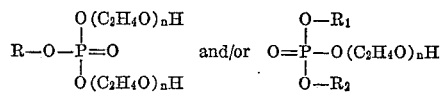

is commercially available. In the above formula, R, $R_1$ and $R_2$ are medium chain alkyl or cycloalkyl groups containing from two to twenty-five carbon atoms, $(C_2H_4O)_nH$ is a hydrophilic group, representing 2 to 100 moles of ethylene oxide per mole of phosphate.

The triester nonionic phosphate surfactant is a commercially available product. One source is Stauffer Chemicals, Victor Chemical Division of New York, N.Y., selling the surfactant under the trademark "Victawet 12." It is recommended for use as a wetting agent and carrier for acid dyes and in the dying of various fabrics. However the advantages gained by using it in emulsion polymerizations which have advantageous properties as a pigment binder have not been known.

Herebefore phosphorous compound emulsifiers or surfactants have been used in the preparation of materials by emulsion polymerization. However they were all of the anionic rather than the nonionic type herebefore described. Though polymers from emulsion polymerizations with anionic phosphate surfactants can be used for various purposes, its use as a pigment binder is completely unsatisfactory because of the chemical instability of the emulsion when mixed with standard pigments. Emulsion polymers prepared with aralkyl and alkyl polyoxyethylene anionic phosphate surfactants when added to various hiding, color, and extender pigments such as titanium dioxide, zinc oxide, clays and similar pigments reacted with the pigments and coagulated. Thus the emulsion cannot be used as a pigment binder or in any product where its chemical reactivity with other matter is undesirable.

Contrary thereto, when preparing emulsion polymers with the nonionic phosphate ester the use of the emulusion as a pigment binder has been most satisfactory. It is highly stable chemically and does not react with the various hiding, inert, or color pigments. Furthermore, it possesses excellent mechanical stability, superior film strength and tends to eliminate foaming problems which often arise in the processing of paints from emulsion polymers. In addition the emulsion polymers with the nonionic phosphate ester has superior color acceptance and retention properties as well as exhibiting a high degree of resistance to weathering and other frictional forces.

In actually reducing the novel product of the present invention to practice, it has been found that in the polymerization process, the surfactants used need not be limited only to the triester nonionic phosphate surfactant. Rather, various other nonionic surfactants as well as anionic surfactants other than the anionic of the phosphate type which are conventionally used in such a process, may be employed, together with a sufficient amount of the triester nonionic phosphate surfactant. The percentage of the phosphate surfactant may vary between 10 to 100% of the total amount of surfactants used in the process.

Some of the nonionic and anionic, other than phosphate surfactants which may be combined with the completely esterified or triester nonionic phosphate surfactant, are included in the following list, it being appreciated that the list is presented for explanatory purposes and is not intended to limit the teachings disclosed herein.

LIST OF SURFACTANTS

Nonionic types:
(1) Ethylene oxide condensation products of fatty acids.
(2) Ethylene oxide condensation products of fatty alcohols.
(3) Ethylene oxide condensation products of fatty amines or amides.
(4) Products obtained by condensation of ethylene oxide with phenolic compounds having a side chain.
(5) Mixtures of the above compounds.

Anionic types:
(1) Products of saponification of fats.
(2) Sulfonation products of fatty acid esters.
(3) Direct sulfonation of fatty matters without previous treatment.
(4) Sulfonation products of fatty amides.
(5) Sulfonated products of natural and synthetic alcohols having six or more carbon atoms; either sodium salts or sulfuric acid esters, R–OSO$_3$Na or true alkali sulfonates.
(6) Sulfonated aromatic hydrocarbons.
(7) Alkyl and aralkyl polyoxethylene phosphates.

The triester nonionic phosphate surfactant used in actual reduction to practice of the present invention can be more specifically defined by the following expressions:

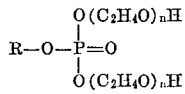

and

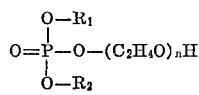

Either of the two surfactants or mixtures of the two have been used with equally successful results. In the above expressions, R, R$_1$, and R$_2$ are saturated alkyl or cycloalkyl groups with or without side chains and consists of 4 to 25 carbon atoms, e.g. butyl, isobutyl. tertiary butyl, pentyl, isopentyl, hexyl, isohexyl, heptyl, octyl, isooctyl, 2-ethylhexyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl; cycloalkyl, e.g. cyclopentyl, cyclohexyl, cycloheptyl, cyclooctyl, methylcyclopentyl, methylcyclohexyl, methylcyclooctyl, 1, 1-dimethylcyclopentyl, 2-dimethylcyclopentyl, 1, 3 - dimethlycyclopentyl, 1, 2 - dimethylcyclohexyl, 1, 3-dimethylcyclohexyl, 1, 4-dimethylcyclohexyl, ethycyclohexyl, trimethycyclopentyls, trimethylcyclohexyls, tetramethycyclohexyls. R, R$_1$ and R$_2$ may be the same or different. $n$ represents the degree of oxyethylenation which ranges from 2 to 100.

The triester nonionic phosphate sufactant can be used in the polymerization of a single monomer, or in the copolymerization of two or more monomers. The monomers which may be used but not limited thereto include vinyl acetate, maleates, fumarates, and alkyl acrylates. Vinyl acetate, vinyl butyrate, and vinyl benzoate can be polymerized with themselves or with comonomers such as the alkyl acrylates, fumarates and maleates. The alkyl acrylates may include methyl acrylate, ethyl acrylate, propyl acrylate, butyl acrylate, 2-ethylhexyl acrylate, methyl methacrylate, ethyl methacrylate, butyl methacrylate, and isobutyl methacrylate. The alkyl acrylates can polymerize with vinyl acetate, vinyl butyrate, vinyl benzoate, styrene, methacrylic acid, acrylic acid, or versatic acid, or then can polymerize with each other. Versatic 10 acid (a Shell Chemical product) can be expressed as

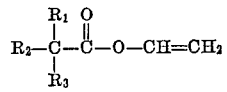

saturated alkyl groups totaling 10 carbon atoms. The maleates, dibutyl maleate and dioctyl maleate will polymerize with vinyl acetate and with each other. The fumarates, dibutyl fumarate and dioctyl fumarate will also polymerize with vinyl acetate and with each other. The vinyl-oxazoline ester, a refined tall oil fatty acid ester of tris amino known as Commercial Solvents Chemacoil TA–100 copolymerizes with either one or more of vinyls, acrylics, and styrene. The relative percentages of the quantities of water, monomers and comonomers which may be used in the polymerization process are exemplified as follows:

| | Percent |
|---|---|
| Water | 40–60 |
| Monomers | 40–60 |
| Comonomers | 0–25 |

The preparation of emulsion polymers of polyvinyl acetate with the completely esterified or triester nonionic phosphate surfactant by the reflux delayed addition emulsion polymerization method may best be explained by describing the method's four basic steps or stages. In the first step, protective colloids, surfactants, initiator and buffer are added to deionized water and mixture is agitated and heated to about 120°–130° F. During the next stage, often referred to as the initiation stage, when the polymerization process starts and is propagated, 5–14% of the monomers are rapidly added to the aqueous phase under agitation while being heated. At about 150°–152° F., the monomers start to vaporize and reflux. The temperature of the mixture is permitted to rise until the reflux action stops, indicating the polymerization of the monomers.

When the reflux action stops, indicating the initial monomers have been polymerized, the third stage known as the delayed addition commences. Additional monomers and initiator are added at a rate controlled to insure desired molecular weight of the polymer. Depending on the formulation, the delayed addition lasts from two to eight hours. Thereafter, final stage takes place. During this stage, the terminal initiator such as potassium persulphate is added and the reactor's temperature is raised by 7 to 12° F. The purpose of this stage is to polymerize any unreacted monomers, keeping the percentage of unreacted or unpolymerized monomer to below 0.5%. Then the reactor is cooled and the pH adjusted to a desired level.

The above described process was followed in the preparation of batches of polymerized vinyl acetate with the completely esterified nonionic phosphate surfactant. The percentages hereafter referred to are of the total batch weight. To a reactor vessel of sufficient size, was added 32.1% deionized water, 6.90% of a five percent hydroxyethyl cellulose solution, 0.12–0.13% completely esterified nonionic phosphate surfactant, 0.17% sodium bicarbonate, 0.085% ammonium persulfate. The mixture was agitated and heated to 115–130° F. Then, 3.5% to 5.0% vinyl acetate was added for the initiation state. When the reactor temperature rose to between 160°–170° F. and the vapor temperature started to decrease from 150° to 130° F., the delayed addition of monomer started. 39.1% vinyl acetate and a .046% ammonium persulfate in a 2.99% deionized water solution was added to the reactor over a 3.5 to 4.0 hour period.

After adding all the vinyl acetate, a small amount of the ammonium persulfate solution was added and the reactor temperature was allowed to rise 7 to 12° F. for one hour. The reactor was then cooled and 0.10% ammonium hydroxide (28%) in 0.575% of deionized water was added between 110°–120° F. It should be appreciated by those familiar with the art that since this formula is for a homopolymer, it had to be externally plasticized. 5.40% of dibutyl phthalate was added along with 6.61% of deionized water and agitated for one-half hour.

The polyvinyl acetate emulsion made by the above procedure showed excellent chemical stability, mechanical stability and superior film strength. When the emulsion was incorporated into a paint, the paint exhibited superior scrub, color acceptance, color retention, durability, and a tendency to eliminate foaming in the manufacture and application stages.

The above process with similar quantities were used in the preparation of another batch except that the 5.40% of dibutyl phthalate was eliminated and the monomers were changed to 41% vinyl acetate and 2.96% butyl acrylate. The results obtained were the same as heretofore described. Other batches were made using 67% ethyl acrylate and 33% methyl methacrylate as monomer, with equally successful results.

Samples from the various batches were used as binders or vehicles for various pigments and the paint tested in accordance with standard tests for resistance to weathering and frictional forces. The paints using the novel emulsion with the nonionic completely esterified phosphate surfactants exhibited superior properties. For example, in the washability test in which a brush soaked in water and a commercial abrasive is cyclically used to scrub a painted surface, the paints in which the emulsions of the present invention were used were within a scrubability range from 1300 to 2000 cycles as compared with 300 to 1300 cycles for paints with standard vehicles. The paints using the novel emulsion of the invention exhibited other superior properties, such as excellent color retention, mechanical stability, and resistance to weathering.

There accordingly has been described herein a new polymerized emulsion including a completely esterified nonionic phosphate surfactant. The unexpected properties of the novel emulsion are particularly desirable when used as a pigment binder or vehicle. Although in the foregoing description, various values have been recited to explain the product and the process of manufacturing it, it should be appreciated that those familiar with the art may modify the given percentages as well as use different compounds without departing from the true teachings of the invention. Therefore, all such modifications are deemed to fall within the scope of the invention as claimed in the appended claims.

What is claimed is:

1. A polymerizable initiator composition for the production of a pigment-binder comprising an aqueous emulsion of a vinyl monomer containing a nonionic phosphate triester surfactant selected from the group consisting of compounds of the formula

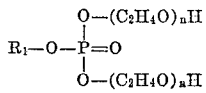

and compounds of the formula

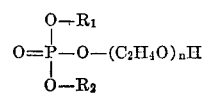

where $R_1$ and $R_2$ are alkyl containing 2 to 25 carbon atoms and $n$ is an integer from 2 to 100.

2. A composition according to claim 1 in which the phosphate triester surfactant comprises at least 10% of the surfactants present.

3. A composition according to claim 1 in which the monomers comprise 40 to 60% of the composition.

4. A composition according to claim 3 in which the monomers are selected from the group consisting of vinyl acetate, vinyl butyrate, vinyl benzoate, lower alkyl acrylates, alkyl maleates and alkyl fumarates.

5. A composition according to claim 2 in which said surfactants exclude anionic phosphate ester surfactants.

6. A process for the production of a polymer pigment-binder emulsion comprising the steps of polymerizing a vinyl monomer in an aqeous emulsion containing a nonionic phosphate triester surfactant selected from the group consisting of compounds of the formula

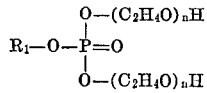

and compounds of the formula

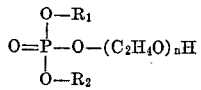

where $R_1$ and $R_2$ are alkyl containing 2 to 25 carbon atoms and $n$ is an integer from 2 to 100.

7. A polymerizable aqueous emulsion for the production of a polyvinyl acetate pigment-binder exhibiting high durability and resistance to weathering and abrasion comprising an aqueous emulsion of vinyl acetate, water, a protective colloid, an initiator and a nonionic phosphate triester surfactant selected from the group consisting of compounds of the formula

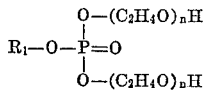

and compounds of the formula

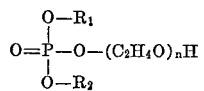

where $R_1$ and $R_2$ are alhyl containing 2 to 25 carbon atoms and $n$ is an integer 2 to 100.

8. The polymerizable emulsion defined in claim 6 wherein the triester nonionic phosphate surfactant comprises at least 10 percent by weight of the surfactants included in the polymerization process.

9. The polymerizable emulsion defined in claim 8 wherein at least a portion of the triester nonionic phosphate surfactant is of the formula

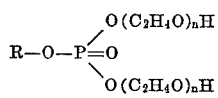

where R is a saturated alkyl or cycloalkyl group with or without side chain and consists of 4 to 25 carbon atoms and $n$ equals 2 to 100.

10. The polymerizable emulsion defined in claim 8 wherein at least a portion of the triester nonionic phosphate surfactant is of the formula

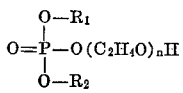

wherein $n$ equals 2 to 100 and $R_1$ and $R_2$ are saturated alkyl or cycloalkyl groups with or without side chains and consists of 4 to 25 carbon atoms.

References Cited

UNITED STATES PATENTS 3,010,929 11/1961 Jones _____ 260—89.1
3,300,423 1/1967 Brown et al.

MURRAY TILLMAN, *Primary Examiner.*

W. J. BRIGGS, *Assistant Examiner.*

U.S. Cl. X.R.

260—85.7, 86.1, 89.1, 89.3, 89.5